United States Patent [19]

Cooper et al.

[11] Patent Number: 4,689,716
[45] Date of Patent: Aug. 25, 1987

[54] MODULAR BARRIER ASSEMBLY

[75] Inventors: James L. Cooper, Miami Springs, Fla.; Clarence L. Welter, Oneonta, Ala.

[73] Assignee: Electrical Equipment, Inc., Birmingham, Ala.

[21] Appl. No.: 881,899

[22] Filed: Jul. 3, 1986

[51] Int. Cl.$^4$ .............................................. H02B 1/00
[52] U.S. Cl. .................................... 361/331; 361/335; 361/347; 200/50 AA; 200/144 R
[58] Field of Search ............... 361/345, 331, 335, 336, 361/342, 347, 339, 338, 357; 200/50 AA, 144 R

[56] References Cited

U.S. PATENT DOCUMENTS 4,233,643 11/1980 Iverson et al. ...................... 361/339
4,449,021 5/1984 Wakayama et al. ............. 200/144 B Primary Examiner—Robert S. Macon
Attorney, Agent, or Firm—Jennings, Carter, Thompson & Veal

[57] ABSTRACT

A barrier for use in electrical terminal cabinets includes a set of barrier guides permanenty affixed to the rear of the cabinets and a set of inwardly extending support rails mounted to the sidewalls of the cabinet. A modular barrier assembly slidably engages the support rails and can be moved into or out of the cabinet without disassembly.

10 Claims, 5 Drawing Figures

MODULAR BARRIER ASSEMBLY

FIELD OF THE INVENTION

The present invention relates to high voltage line equipment and particularly to terminal equipment such as fuses and switches. More particularly the present invention relates to cabinet barriers for isolating fuses and switches in high voltage cabinets. In even greater particularity the present invention relates to modular barriers which are detachably affixed within high voltage cabinets to isolate such switches and fuses.

BACKGROUND OF THE INVENTION

High voltage cabinets are conventionally provided with permanently attached barriers which serve to isolate switchgear, fuses or switches, which are enclosed within the cabinets. These barriers are made from rigid non-conductive material and serve not only to isolate the electrical elements from each other but also prevent inadvertent contact between a workman and a "hot" terminal. Such barriers function quite well for their intended purpose and the present invention is not directed to an improvement in the electrical characteristics of the barrier. However, despite the recognized value of the barrier, they constitute a nuisance to technicians who are required to initially install or rework the connection of the high voltage wires to the switchgear. When the barriers are in place, access to the terminal connection is limited because the barrier extends outwardly from the rear wall of the cabinet intermediate each set of connections. Therefore it is common practice for the technician to disassemble the barriers and remove it piece by piece to gain access to the switchgear connection. The disassembled barrier is replaced after the necessary operation in the cabinet has been performed, however oftentimes the barrier is incompletely replaced or inadequately secured in the cabinet, thereby creating a hazardous condition which may lead to inadequate isolation between adjacent fuses or switches or to injury to a subsequent technician working on the terminal. Furthermore, even if the barrier is properly replaced, the technician has expended a great deal of costly labor performing a simple mechanical function in disassembling and reassembling the barrier.

SUMMARY OF THE INVENTION

It is the object of the present invention to provide a barrier system for isolating high voltage fuses and switches which may be readily removed from an associated cabinet, thereby reducing the amount of labor expended in disassembling and reassembling the barrier.

Another object of the invention is to improve the reliability of barrier units by making the units modular in construction whereby the entire unit may be removed without disassembly thus preventing improper reassembly of the barrier upon reinstallation.

Yet another object of the invention is to prevent damage to the associated fuses and switches during the disassembly of the barrier system.

These and other objects and advantages are accomplished in our invention by the use of a modular construction in the main barrier assembly which is removably positioned in an associated cabinet on a permanently affixed guide assembly. The guide assembly assures proper positioning of the modular barrier assembly to prevent damage to the switchgear and assures that the barrier assembly properly isolates the individual components of the switchgear. The guide assembly utilizes a set of sidewall carriers to support and align the assembly and a set of rearwall barrier guides which position the modular barrier between the switchgear components and prevents transverse distortion of the barrier.

BRIEF DESCRIPTION OF THE DRAWINGS

Apparatus embodying features of our invention are depicted in the accompanying drawings which form a portion of this application and wherein.

DESCRIPTION OF A PREFERRED EMBODIMENT

Figure 1:
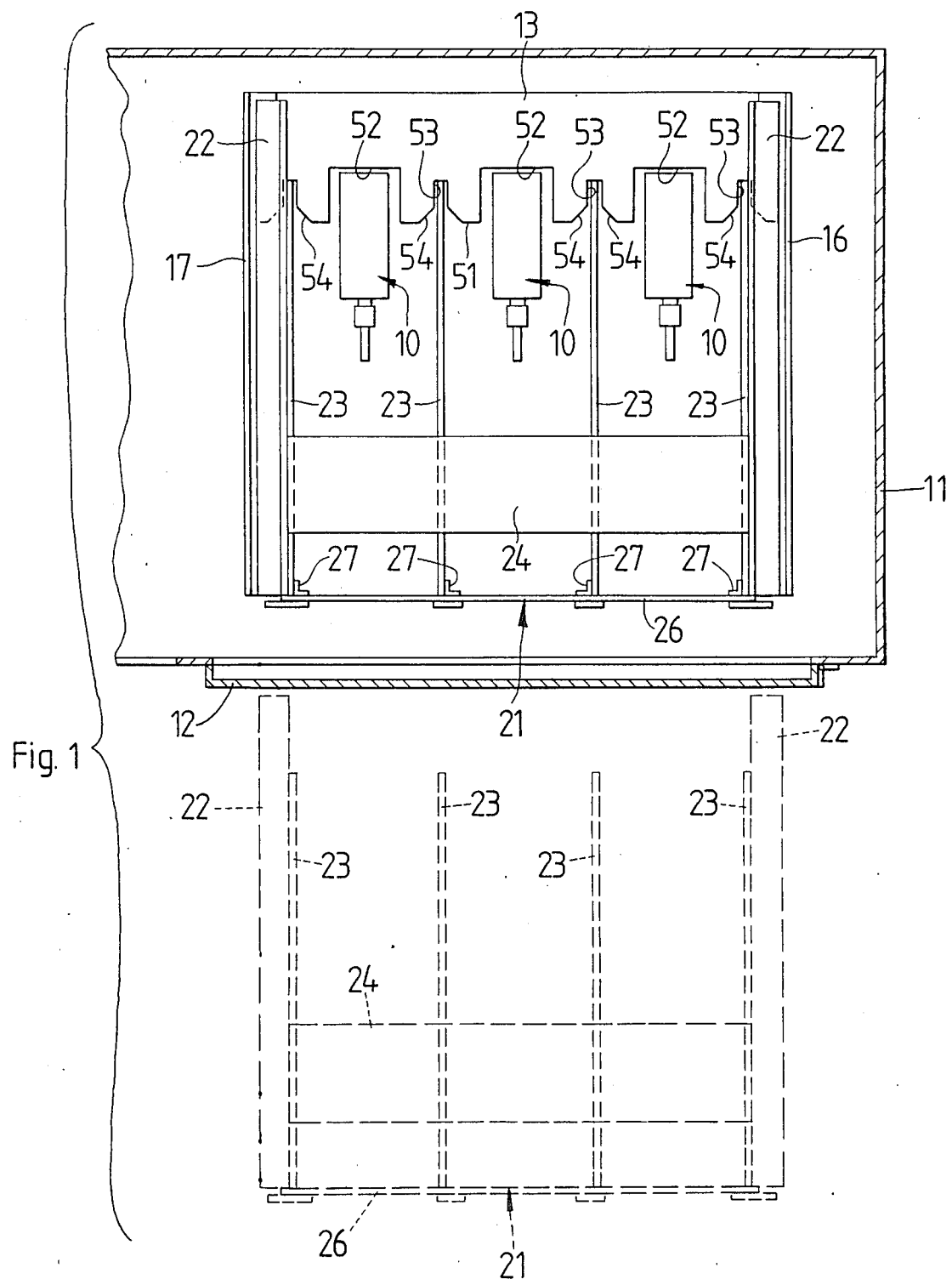
FIG. 1 is a plan view of our barrier system showing the associated switchgear.
Figure 2:
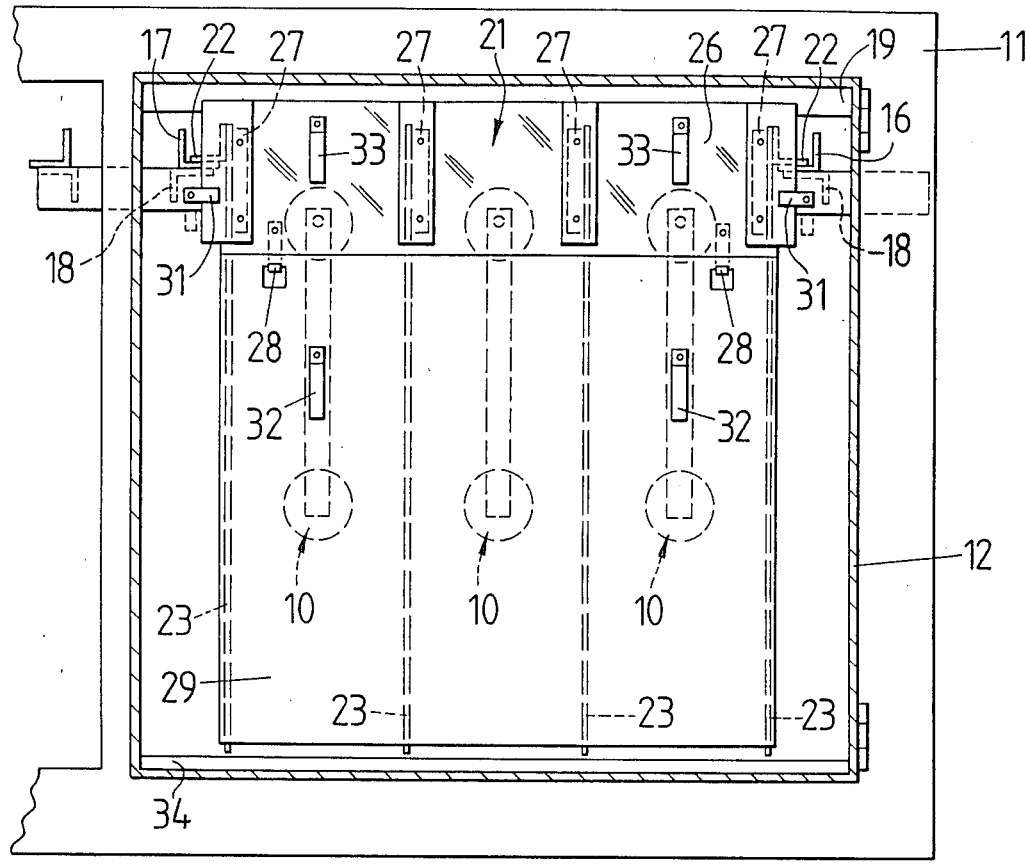
FIG. 2 is a front elevational view of our barrier system showing the door in section.

Referring to FIG. 1, it will be appreciated that our barrier system performs the same function as a conventional barrier, that is to isolate the components of electrical switchgear. The switchgear 10 may consist of switches such as three pole group operated switches, or fuses associated with 15 to 38 KV terminals. The switchgear 10 is located inside a metal cabinet 11 with frontally opening doors 12 through which the technician gains access to the equipment for repair or refurbishing the switchgear 10. Affixed to the cabinet 11 at the rear thereof is an upper guide barrier 13 and a lower guide barrier 15, which are planar horizontally aligned panels of a non-hygroscopic fiber-glass reinforced polyester barrier material. The guide barriers 13 and 14 are identical in shape and configuration and may be affixed to the cabinet 11 in any convenient manner which will assure that they remain in their respective positions.

Inwardly facing guide rails 16 and 17 are affixed to the top of upper guide barrier 13 near the ends thereof and extend parallel to each other toward the front of the cabinet 11. The guides are supported by an angle attachment 18 carried by the cabinet 11. A top protective barrier 19 mounted to the cabinet 11 above doors 12 restricts access to high voltage areas within the cabinet 11 and is permanently affixed thereto.

Figure 3:
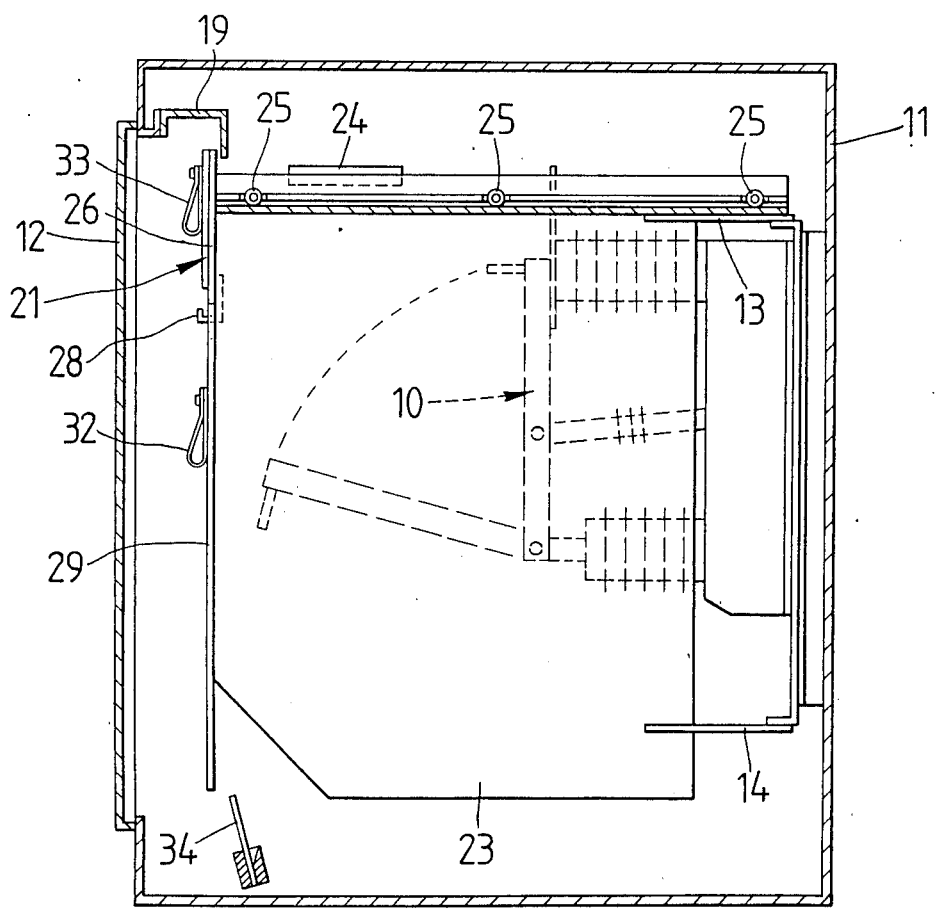
FIG. 3 is a side elevational view of our barrier system.
Figure 4:
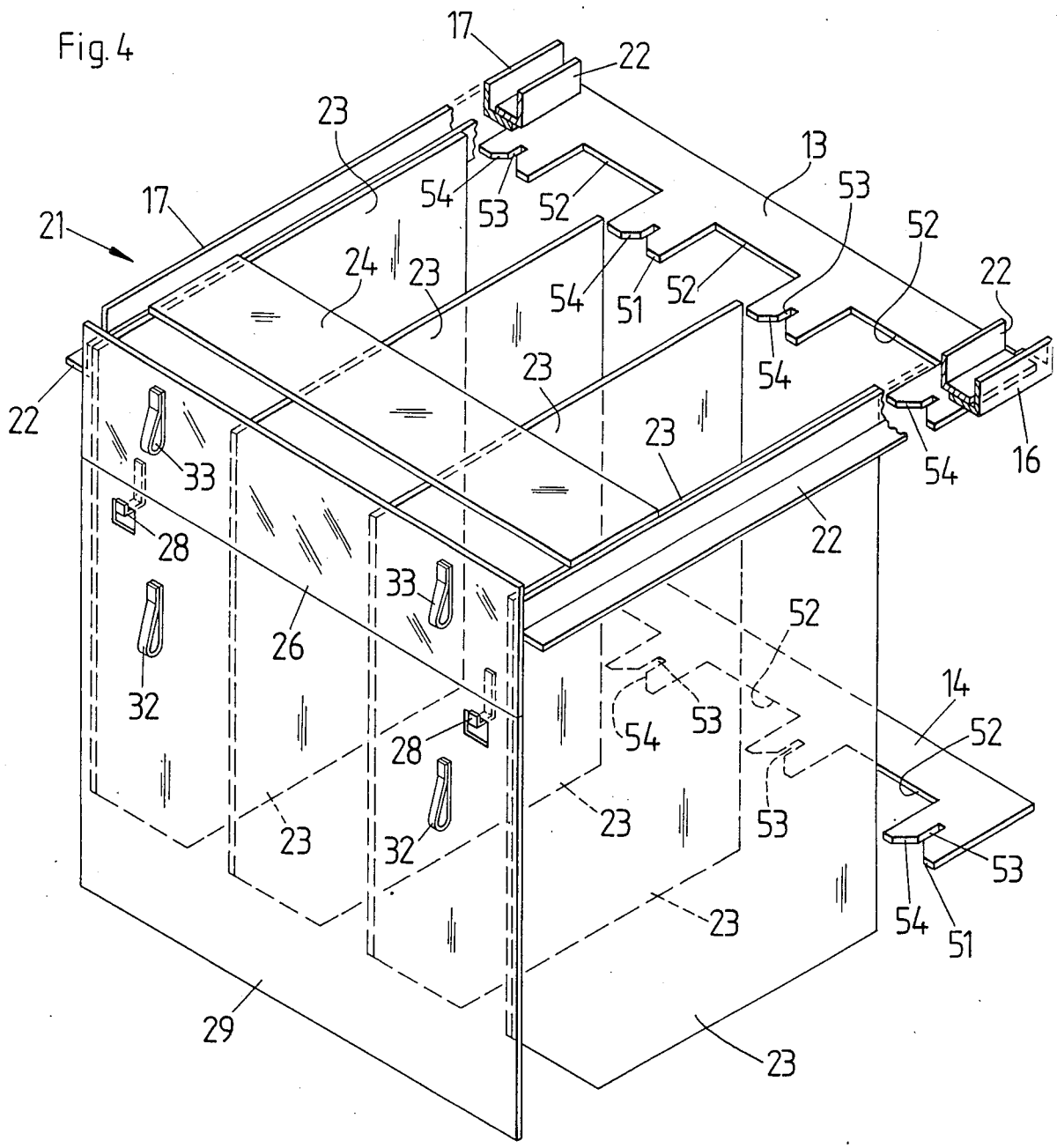
FIG. 4 is a perspective view of our barrier system shown withdrawn from an associated cabinet.

A barrier module 21 is provided to slide into and out of the cabinet 11 and is supported on the guide rails 16 and 17 when positioned within the cabinet 11. The module 21 includes a pair of outwardly extending runners 22, which may be angle elements which slidingly engage the guides 16 and 17 or carry a plurality of non-metallic rollers 25 which roll along the guides 16 and 17 as shown in FIG. 3. A plurality of vertical partitions 23 are spaced between the runners 22 with the outermost partition 23 being affixed along the top edge thereof to the runner 22. Each vertical partition 23 is connected to a transversal 24 which spans the runners 22 and supports the interior vertical partitions 23.

The upper front portion of each partition 23 is affixed to a transparent viewing window 26 which spans the width of the modular barrier assembly 21. Each partition 23 is permanently affixed to the viewing window 26 by an angle member 27 such that the window 26 is maintained perpendicular to the partitions 23. Suspended from the window 26 by a pair of hooks 28 is a front barrier 29 which extends across the space between the outermost partitions 23. The outermost partition of the window 26 is engaged by a conventional latch 31 which is used to lock the modular assembly into the cabinet 11. A pair of lift loops 32 are attached to front barrier 29 such that the barrier 29 may be lifted either manually or with a hot stick. Likewise a pair of pull loops 33 are affixed to the modular barrier assembly 21 such that the assembly may be removed by pulling them with a hot stick or manually. A removable bottom barrier 34 spans cabinet 11 beneath the modular assembly 21 to complete the isolation of the switchgear.

The upper and lower guide barriers 13 and 14 each have a shaped forward surface 51 which includes recesses 52 wherein the switchgear is positioned and slots 53 which receive the individual vertical partitions 23. The slots 53 are flared as at 54 to guide the vertical partition into proper alignment when the modular assembly 21 is inserted into the cabinet. The guide barriers 13 and 14 are perpendicular to the partitions 23 and thus provide lateral stability to the modular assembly 21 when inserted.

Figure 5:
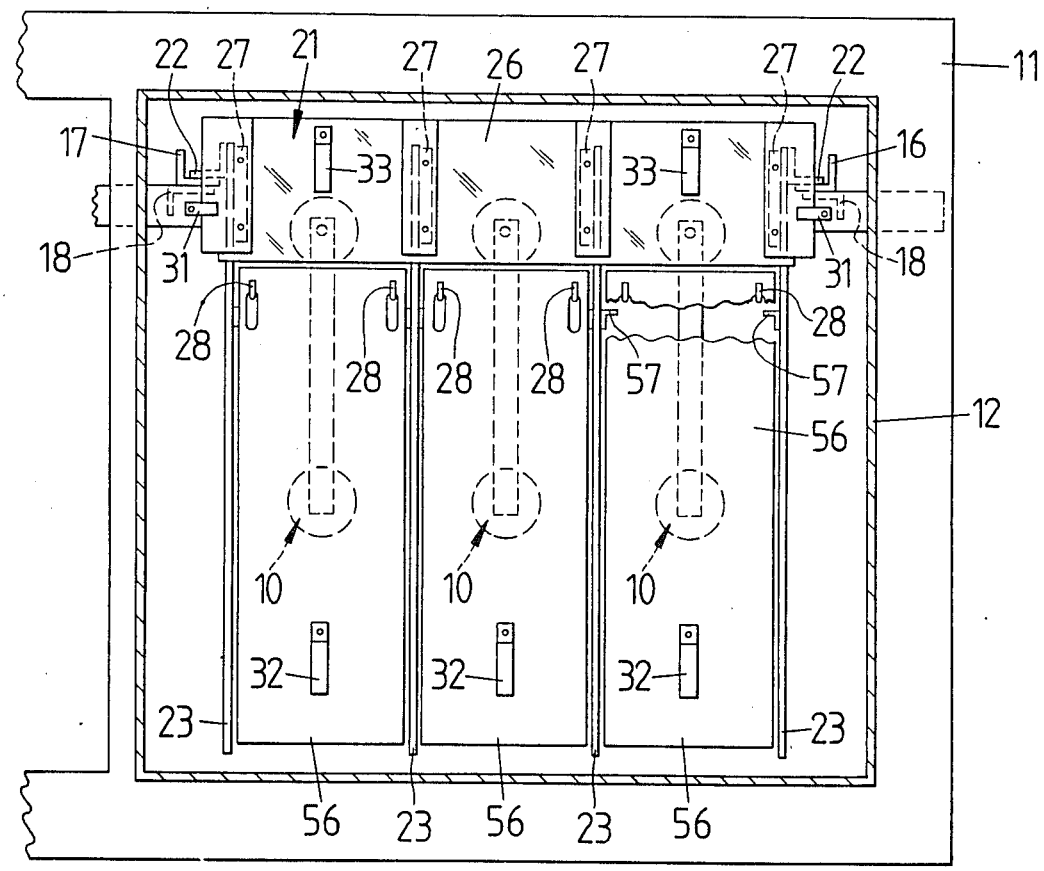
FIG. 5 is a front elevational view of a second embodiment of our barrier system.

It will be appreciated that our modular barrier may be provided with dual purpose doors 56 as shown in FIG. 5. These doors can be removed from their normal suspended positions and placed on a set of supports 57 carried by the vertical partitions 23 thereby forming a barrier in the gap of an open fuse or switch.

From the above it may be seen that our modular barrier can readily be removed from the cabinet 11 to enable an installer to properly terminate electrical cables to the switchgear in a minimum amount of time without the necessity of disassembling the barrier. In normal operation, the barrier functions precisely as does a conventional built-in barrier. The vertical partitions 23 isolate the switchgear from each other and from the sidewalls of the cabinet and the front barrier 29 prevents inadvertent contact with the switchgear through the door 12. The fuses and switches of the switchgear can be visually checked through the window 26 with the barrier assembly 21 in place and the switchgear can be manipulated with the barrier assembly 21 in place by simply removing the front barrier 26 or doors 56.

Yet, when it becomes necessary to rework the cables connected to the switchgear, the technician simply disengages the latch 31 and withdraws the modular barrier assembly 21 from the cabinet, sets it aside, performs his task, then reinserts the assembly 21 and engages the latch 31. This results in a tremendous savings in man-hours which have heretofore been expended disassembling and reassembling built-in barrier units. Further the barrier system maintains its structural integrity regardless of the number of times it is removed from the cabinet, because the only fastening element which needs to be engaged is the conventional latch 31. Consequently our barrier system constitutes a vast improvement over existing systems in terms of safety, reliability and maintenance efficiency.

While we have shown our invention in three forms, it will be obvious to those skilled in the art that it is not so limited but is susceptible of various changes and modifications without departing from the spirit thereof.

What we claim is:

1. In a cabinet or the like enclosing a plurality of high voltage switches or fuses wherein each switch or fuse is to be isolated, a barrier system comprising:

(a) a modular non-conducting barrier enclosure having a predetermined number of internal compartments according to the number of said fuses or switches to be isolated;
    (b) means affixed to said cabinet for supporting said barrier enclosure such that said enclosure may be moved into or out of said cabinet along said support means;
    (c) means affixed to said cabinet for aligning and reinforcing said barrier enclosure; and
    (d) means for detachably locking said barrier enclosure into position within said cabinet.

2. The barrier system as defined in claim 1 wherein means for supporting comprises a set of inwardly facing rails affixed to said cabinet and where said barrier enclosure depends from a set of outwardly facing flanges affixed thereto and slidingly engagable with said rails.

3. The barrier system as defined in claim 1 wherein said means for supporting comprises a set of inwardly facing horizontally aligned rails and further comprising a plurality of rollers carried by said barrier enclosure for cooperative engagement on atop said rails.

4. The barrier system as defined in claim 1 wherein said modular barrier comprises:

(a) a transparent front panel extending across the interior width of said cabinet;
    (b) a detachable front barrier affixed to said front panel;
    (c) a plurality of vertical partitions affixed to said front panel and extending rearwardly;
    (d) a laterally extending flange member affixed to the top of each side of said front panel and extending rearwardly therefrom with said flange being slidably supported on said support means.

5. The barrier system as defined in claim 4 wherein said support means comprises a pair of rail members cooperatively positioned to support said enclosure on said flanges for sliding movement therealong.

6. The barrier system as defined in claim 4 wherein said means for aligning and reinforcing said internal compartment comprises:

(a) a substantially planar member extending substantially the width of said enclosure and affixed internally of said cabinet in a horizontal plane having a plurality of outwardly opening slots formed therein with each slot cooperatively positioned to receive one of said partition walls such that said planar member and said partition walls are perpendicular with each said slot flaring outwardly proximal the open end thereof to form guide surfaces for directing said partition walls into said slots.

7. A barrier system for isolating individual switchgear components from each other and an associated metal enclosure comprising:

(a) a modular non-electrically conducting assembly defining a plurality of adjacent partitions with each partition adapted for isolating an individual switchgear component from an adjacent component or said enclosure;
    (b) means attached to said enclosure for supporting said assembly within said enclosure such that said assembly may be withdrawn from said enclosure;
    (c) means fixed to said enclosure for aligning and reinforcing said partitions within said enclosure; and
    (d) means for detachably locking said assembly within said enclosure.

8. The barrier system as defined in claim 7 further comprising at least one detachably connected barrier door supported by said assembly perpendicular to said partitions.

9. The barrier system as defined in claim 8 wherein said means for supporting comprises a pair of inwardly facing horizontally aligned rails and wherein said modular assembly includes a pair of outwardly extending runners cooperatively engaging said rails.

10. The barrier system as defined in claim 9 wherein said means for aligning comprises an upper and lower planar guide member extending horizontally and perpendicular to said partitions with said guide members having a plurality of outwardly opening vertically aligned slots formed therein for receiving said partitions with said slots flaring outwardly proximal the open end thereof and having a plurality of recesses for said switchgear intermediate said slots.

* * * * *